July 26, 1949.  J. L. HAYNES  2,477,517
RAILROAD FREIGHT CAR TRUCK
Filed Feb. 10, 1945 3 Sheets-Sheet 1
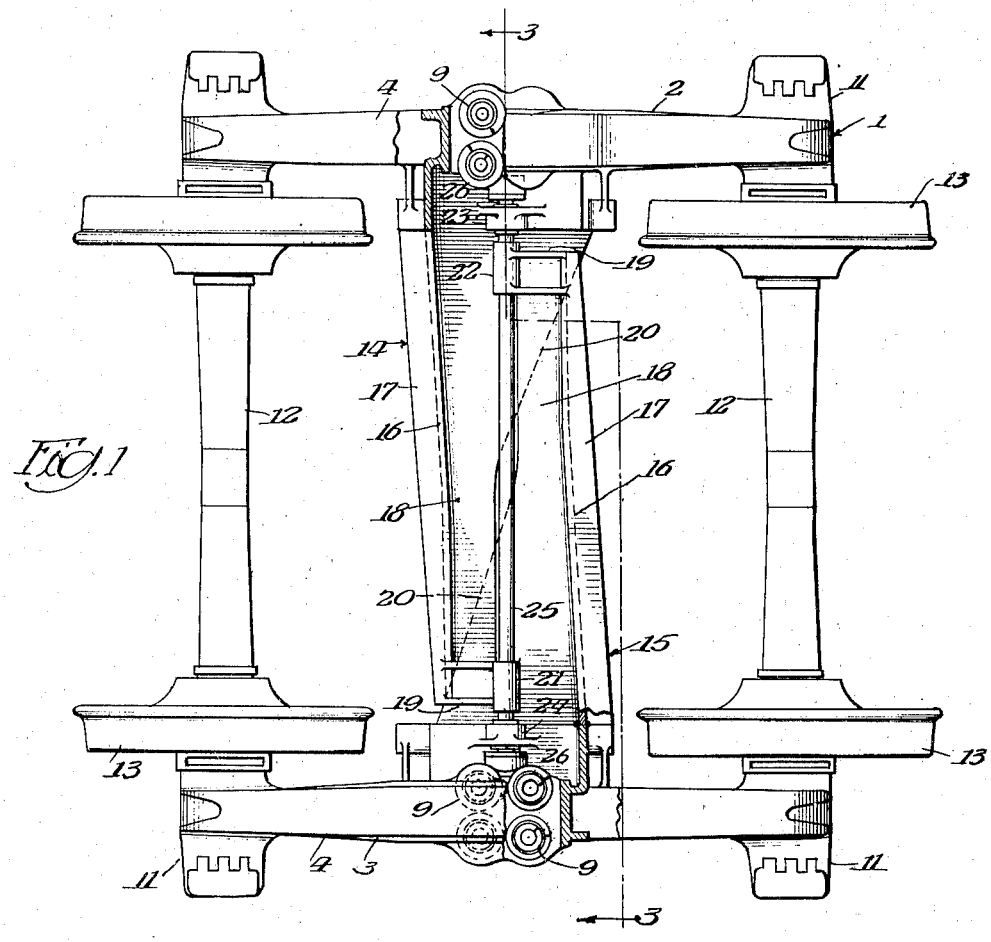
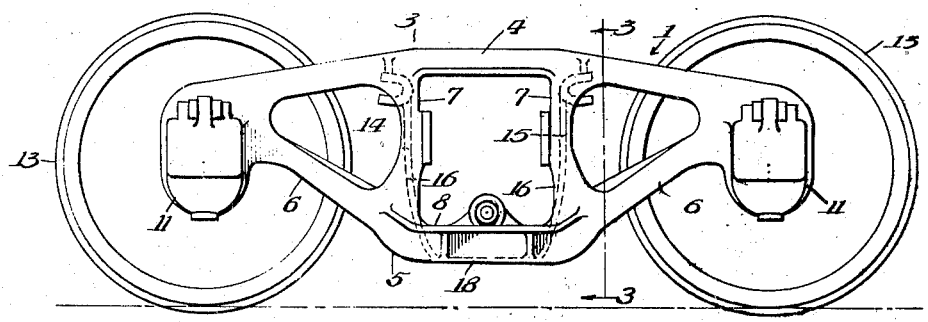
Inventor
James L. Haynes
By Spencer, Marzall, Johnston & Cook
Attys July 26, 1949.  J. L. HAYNES  2,477,517
RAILROAD FREIGHT CAR TRUCK
Filed Feb. 10, 1945  3 Sheets-Sheet 2
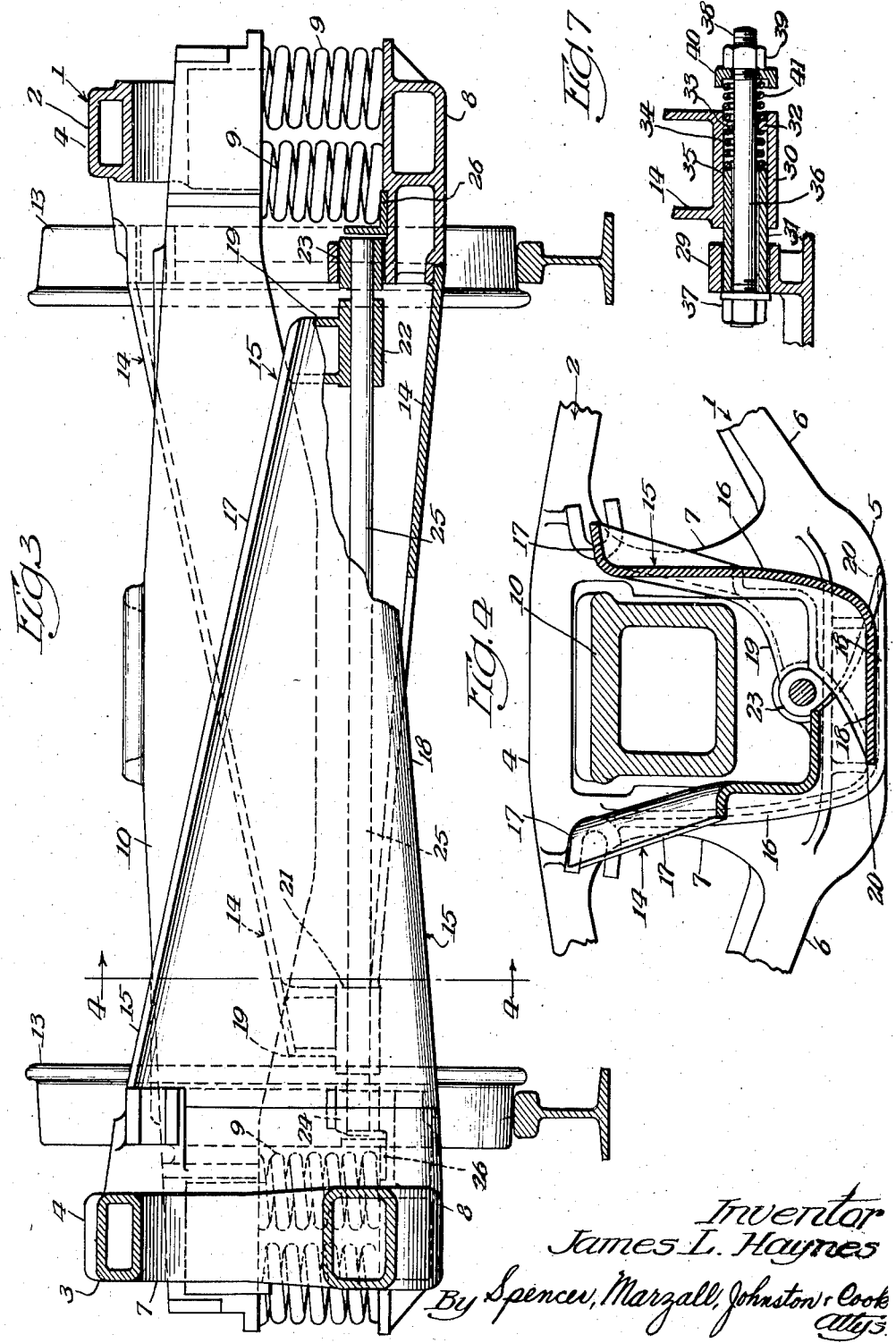
Inventor
James L. Haynes
By Spencer, Marzall, Johnston & Cook
Attys July 26, 1949.  J. L. HAYNES  2,477,517
RAILROAD FREIGHT CAR TRUCK
Filed Feb. 10, 1945  3 Sheets-Sheet 3
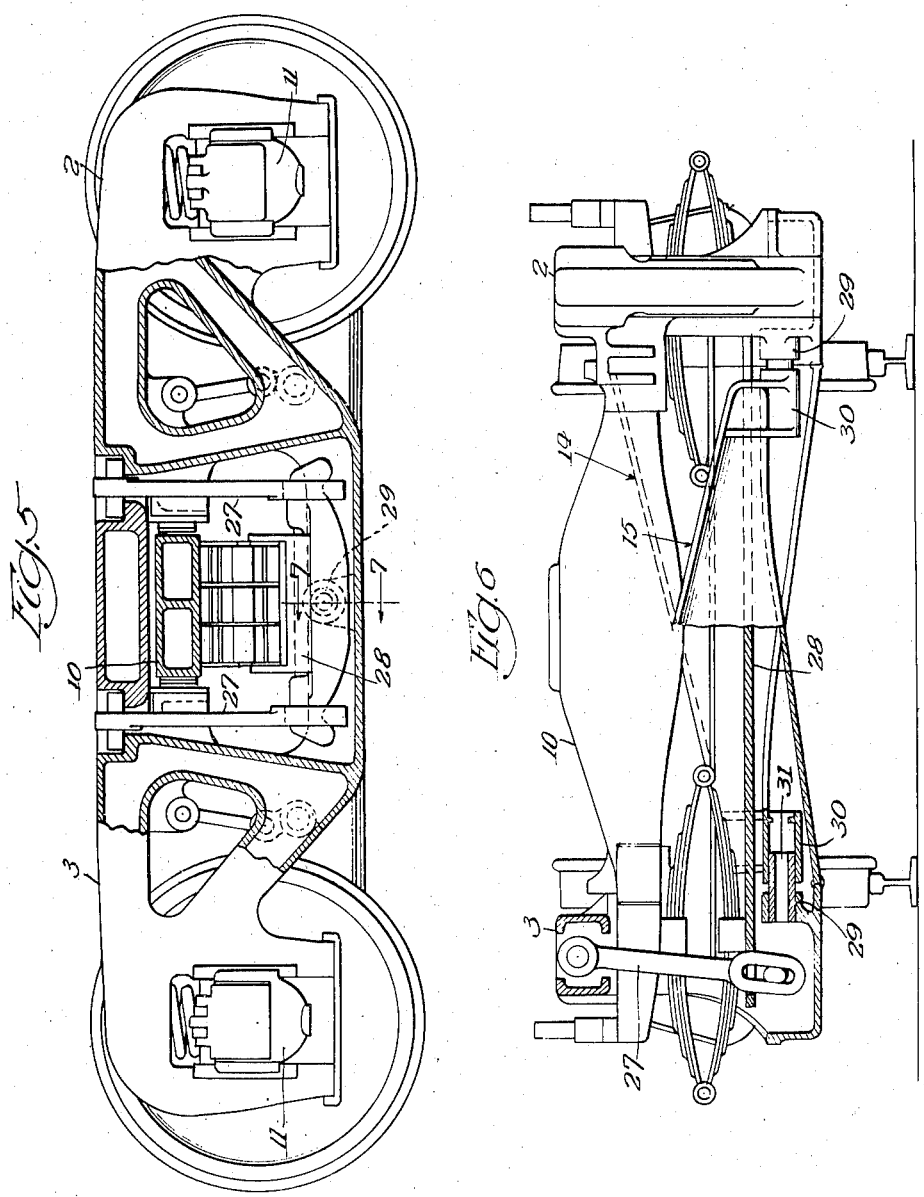
Inventor
James L. Haynes
By Spencer, Marzall, Johnston & Cook,
Attys Patented July 26, 1949

2,477,517

UNITED STATES PATENT OFFICE 2,477,517

RAILROAD FREIGHT CAR TRUCK

James L. Haynes, Glen Ellyn, Ill.

Application February 10, 1945, Serial No. 577,191

20 Claims. (Cl. 105—208)

This invention relates to railroad car trucks in general and particularly to railroad freight car trucks.

The construction of freight car trucks must necessarily be different from the construction of passenger car trucks for numerous reasons. In freight car trucks certain features must be incorporated to permit interchangeability with freight car trucks of other railroads, freight car trucks being sent all over the United States and Canada as provided under the A. A. R. interchange rules. Passenger trucks, on the other hand, are practically always operated on the lines owning them and, therefore, interchangeability is not of such important consequences. Freight car trucks being subject to interchange rules must, therefore, conform to certain limitations concerning overall dimensions as to cars, trucks and various details, therefore limiting the latitude of design. Moreover, in the design of freight car trucks, commercial consideration must be given with respect to the design of the trucks. The cost of freight car trucks must be low; there must be no costly machine work; the couplings on the cars must be of a relatively standard height. Novelties which will preclude the use of standard brake rigging and other standard parts should not be used, as such parts are applied interchangeably at repair shops for nearly all makes of trucks, and it would be an extremely expensive operation to make changes in the standard designs of much of the equipment as the present practice of changing and servicing bearings, wheels, axles, etc. should be continued.

Passenger cars, on the other hand, are designed chiefly to ride comfortably and smoothly at high speeds and, inasmuch as passenger cars are practically always owned by the railroad upon which they are used and not interchanged like freight cars, special equipment may be used and new designs for smooth riding at high speed operation may be used on passenger cars, which construction would not be adaptable for use in freight car construction. However, it is essential that freight car trucks be made so that they will conform with certain A. A. R. standards and that certain present conventional equipment employed on standard freight cars be used; also, the cost of freight car trucks must be kept extremely low. Nevertheless, due to the demand for faster transportation, it is desirable that freight car trucks be so designed so as to give smooth riding qualities at very high speeds so that material carried by the cars will not be jarred or shaken up so as to become damaged.

Passenger car trucks are generally of the four or six wheel type, and the construction is such that the axles are always parallel and at right angles to the longitudinal center line of the truck. This accurate positioning of the wheels and axles is secured by having a carefully made truck frame which is strong and rigid enough to resist the forces required to maintain the journal boxes or bearings, together with the axles and wheels, in their proper alignment and parallel positions at all times.

Heavy, rigidly built truck frames, together with other members, such as forged equalizers and swing suspended bolsters, are in general use for passenger car trucks because they have been found necessary to produce easy riding qualities at the high speeds which are usual for passenger trains.

Freight cars or freight car trucks would be far more costly than present conventional types if we attempt to follow passenger designs for high speed freight service as a means of obtaining satisfactory riding qualities in freight cars that are operated at passenger car speed. Moreover, the weight of freight cars must be kept as low as possible so that as great a pay load may be included as possible. Moreover, the weighted load of a passenger car is not much more than the unloaded passenger car, while a loaded freight car is several times that of the unloaded freight car. This difference in weight between loaded and unloaded freight cars must be taken into consideration, but this is a consideration which is small with respect to passenger cars.

It is, therefore, the primary object of the present invention to provide a new and novel freight car truck construction which will permit the truck to travel at a very high speed and still ride comfortably and smoothly without materially increasing the weight of the trucks or materially affecting the design in such a manner whereby standard apparatus and equipment, such as brake rigging, etc., may be used.

Another important object of the invention is the provision of a new and improved freight car truck which is adapted to operate at high speeds; which will ride smoothly; which will require no costly machine work; which is adapted to employ in the production thereof standard facilities now used in the manufacture of conventional car trucks; which will not be materially increased in weight; which will eliminate as much machine work as possible; which will permit the use of standard equipment, such as brake rigging; and which is so constructed that the present practice of servicing and changing bearings, wheels, axles and other parts thereof, may be followed.

A further object of the invention resides in the provision of a freight car truck frame which is provided with a new and improved means to prevent the side frames of the truck from moving out of parallel due to the loose fits between the side frames and the bolster and the spring plank (if a spring plank is used).

A further object of the invention is the provision of new and novel means to prevent the side frames from getting out of square with the bolster and axles, so that the wheels will be assured of lining up with the track or with the other wheel on the same side of the frame of the truck.

A further object of the invention is the provision of a freight car truck employing simple means for joining the two side frames of the truck so that the frames may be strongly and accurately held in parallel planes at all times, regardless of the speed or kinetic forces imposed in operation, the means for joining the frames also having the purpose of permitting the frames to rotate through a considerable angle relative to each other, in two parallel planes, the frames being rotated about a transverse axis directly below the center of the bolster and a few inches above the lower edges of the side frames.

A further object of the invention is to provide a truck of novel construction to permit a slight mutual approachment or separation between the two truck side frames through provision of joining means having provision for axial displacement with respect to the frames coincident with the rotary movement of the joining means with the frames, the axial displacement being resisted by cooperating spring members whose purpose is to partially equalize the thrust loads on the bearings at both ends of the car truck axles when the car is traveling around a curve.

Numerous other objects and advantages will be apparent throughout the progress of the following specification.

The accompanying drawings illustrate a selected embodiment of the invention and the views therein are as follows:

Fig. 1 is a detail top plan view of one form of freight car truck and embodying the invention, parts being broken away for the sake of clearness;

Fig. 2 is a detail side elevation of the truck shown in Fig. 1;

Fig. 3 is a detail transverse sectional view on the line 3—3 of Figs. 1 and 2, parts being broken away for the sake of clearness;

Fig. 4 is a detail transverse sectional view on the line 4—4 of Fig. 3;

Fig. 5 is a detail side elevational view of another form of truck particularly for use on passenger cars and embodying the invention, certain parts being broken away for the sake of clearness;

Fig. 6 is a detail sectional view taken transversely through the truck shown in Fig. 5, certain parts being broken away for the sake of clearness; and Fig. 7 is a detail sectional view on the line 7—7 of Fig. 5.

The particular construction shown in Figs. 1 to 4, inclusive, for the purpose of illustrating the invention comprises a freight car truck 1 having oppositely disposed side frames 2 and 3. The side frames 2 and 3 each comprise a longitudinal forward to rearward extending top member 4 and a bottom member 5. Each bottom member 5 is integrally connected to the top member 4 by upwardly converging integral parts 6, 6. Upwardly extending elements 7, 7 are integrally connected to the upper and lower members 4 and 5 as clearly shown in Fig. 2.

Each side frame includes integral castings 8, 8 to which the usual springs 9 are mounted for supporting the truck bolster 10. The castings 8, which are a part of the member 5, may also, if desired, comprise a part of the journal box construction 11.

Transverse axles 12, 12, which carry the wheels 13, have an exterior journal portion inside of the journal box housing construction 11.

The truck construction so far described is of conventional arrangement and in many ways is unsatisfactory in that cars so equipped are unable to travel safely at very high speeds. Also, the conventional truck construction does not provide for maintaining the side frames in proper parallelism.

The invention provides means for maintaining the side frames in proper spaced parallel position at all times as well as permitting the side frames to have relative pivotal arcuate movement with respect to each other to compensate for superelevation of the rails when the train goes around a curve or in cases of uneven rails and road bed. This means comprises transversely extending bars 14 and 15 rigidly secured to the side frames 2 and 3, respectively. The bar 14 is of angulated construction having a vertically extending body portion 16, an upwardly, outwardly extending flange portion 17, and a relatively horizontally inwardly extending lateral portion 18. An end section 19 is integrally connected with the vertical portion 16 and the lower inwardly extending portion 18. The inner edge 20 of the horizontally extending portion 18 of bar 14 is curved as indicated so as to have movement corresponding with the similar edge of the member 15, so that movement of one side frame in a vertical arc will be mutual with respect to the movement of the other side frame in a vertical arc of several degrees without obstruction between the members 14 and 15. One end of the member 14 is secured to the side frame 2 by welding or other means so as to secure the member 14 rigidly to the side frame. The side and bottom parts 16 and 18, respectively, are relatively wide at the point of attachment and taper toward the outer end which is relatively narrow.

The bar 15 is constructed identically with the member 14 and includes the same parts 16, 17, 18 and 19, with a cooperating carved edge 20.

The free ends of the members 14 and 15 are provided with aligned cylindrical bearings 21 and 22, respectively. Aligned bearings 23 and 24 are secured rigidly to the side frames 2 and 3, respectively, and these aligned bearings 23 and 24 are in axial alignment with the aligned bearings 21 and 22. A transverse extending pivot rod or bar 25 passes from left to right, Fig. 3, through the bearings 24—21—22—23, to pivotally support the members 14 and 15 at their free ends in the frames at the mid-point opposite to their rigid connection with the frames. The pivotal connection of the bar 25 with respect to the members 14 and 15 permits the side frames to have relative arcuate movement and at the same time maintains side frames 2 and 3 in proper parallel position, preventing the side frames from shifting or moving out of parallelism with each other. Also, the members 14 and 15, because of their connection with the side frames 2 and 3, prevent one side frame from creeping or shifting ahead of its mating or corresponding side frame of the truck.

It is desirable that the members 14 and 15 be made as light in weight as possible but sufficiently strong to perform properly the function intended, and it is desirable that the members 14 and 15 be pressed from relatively thick, flat plates bent to the configuration above described. If desired, the ends of each member 14 or 15 may be secured to its cooperating side frame by welding the ends to an inside surface or suitable flange of the side frame and the configuration of the plates before the stamping operation may be properly contoured by flame cutting. The members 14 and 15 are identical in shape, size and construction so that they may be applied to opposite frames without making special right and left hand designs. Longitudinal shiftable movement of the rod 25 is prevented by means of angle members 26 which are suitably retained in the side frames 2 and 3. These members 26 may comprise angular shaped members properly nested with a spring plate or they may constitute a turned up angular part of the spring plate.

Figs. 5 to 7, inclusive, disclose a modified form of construction applied to a different type of truck construction. The truck construction is of the four-wheel type and may be of the construction as used on certain conventional passenger coaches. The truck disclosed in Figs. 5 and 6 employs elliptical springs mounted beneath the bolster 10, and swing hangers 27 may be provided to allow the bolster 10 and the bolster spring plank 28 to swing transversely to dampen the side shocks due to the relative lateral movement of the truck and the car body during operation on the rails and thereby provide for easy riding. The members 14 and 15 are adapted to be applied to the truck construction disclosed in Figs. 5 and 6. Members 14 and 15 are secured to the side frames 2 and 3 of the truck construction shown in Figs. 5 and 6 in the same manner in which they were described in the truck construction disclosed in Figs. 1 to 4. The embodiment of the truck construction shown in Figs. 5, 6 and 7 comprises annular bosses 29, 29 on the side frames 2 and 3, respectively, and these bosses may be integrally cast with the side frame. Cylindrical bearings 30, 30 are rigidly secured to the free ends of the members 14 and 15, Figs. 5 and 6, there being a sleeve 31 operatively received in each boss 29 and welded to the bosses while being held in the proper accurate aligned position. The sleeve 31 is received within the cooperating bearing 30 as clearly shown in Fig. 7. The sleeve 31 is shorter in length than the distance between the opposed ends of the bosses 29 and the bearings 30, as clearly shown in Fig. 7. One end of the bearing 30 may be provided with an annular wall 32 in which a circular opening 33 is provided. A coil spring 34 is arranged between the end 35 of the sleeve 31 and the annular wall 32. A round rod 36 extends through the sleeve 31 and through the circular opening 33, being held against the boss 29 by a nut and washer construction 37. The other end of the rod 36 is threaded as indicated at 38 and receives a nut 39. A cup-shaped member 40 is mounted on the rod 36 adjacent to the nut 39 and a lock spring 41 is interposed between the outer end of the annular wall 32 and the cup-shaped member 40 for the purpose of providing a spring resistance against side thrusts between the two side frames 2 and 3. The springs 34 and 41 are preloaded by tightening up the nut 39 on the bolt 36 so that there is definite resistance to moving the two sides frames 2 and 3 relative to each other either inwardly or outwardly, depending upon the amount of preload provided in the springs 34 and 41. Other resilient means may be substituted for springs 34 and 41, such as rubber springs. The purpose of this provision is to facilitate the partial equalization of thrust loads which must be transmitted from the bearings on the journals to the side frames when rounding curves. By proper control of the lateral clearances between the thrust resisting flanges on the journal boxes and the cooperating thrust surfaces of the side frame, the total thrust which must be transmitted between the axles and the truck frames can be partially equalized between the two side frames because after contact at one pair of thrust surfaces of journal box and side frame at one end of the axle, the increased deflection of the preloaded springs 34 and 41 will permit relative movement in parallel positions between the two side frames until the corresponding thrust transmitting surfaces, at the opposite end of said axle and other side frame, come into contact and thereby carry the remaining part of the thrust load which has been imposed.

The invention provides a unique construction for car trucks, particularly freight car trucks, to maintain the side frames of the trucks in proper parallelism at all times and prevent one side frame from shifting or creeping ahead of the side frame on the other side of the truck. The structure disclosed for attaining this desired condition is relatively inexpensive to manufacture and can be readily, quickly and economically applied without in any way changing or hindering the standard manufacturing methods of standard truck manufacture. The construction shown in Figs. 1 to 4 can be substituted for the construction disclosed in Figs. 5 to 7, inclusive, or vice versa. Changes may be made in form, construction and arrangement of parts without departing from the spirit of the invention, and all such changes may be made as fairly fall within the scope of the appending claims.

The invention is hereby claimed as follows:

1. A railroad truck comprising side frames, conjugate members fixed by one end to each side frame to form identical units, said members extending across to, and having direct pivotal engagement with the other side frame to maintain the side frames in proper parallelism, said members having the pivotal engagement with a frame substantially midway between the ends of a frame.

2. A railroad truck comprising two identical side frames, a member fixed to one side frame, said member extending across to and terminating adjacent the center of the other side frame, and means on the said other frame pivotally and slidably receiving an end of said member.

3. A railroad truck comprising spaced side frames, each frame having a member secured thereto and extending in the direction of and terminating adjacent the other frame, said frames each having a member carried thereby for slidably and pivotally receiving the end of the first named member that is carried by the opposite side frame.

4. A railroad truck comprising side frames, and members for maintaining said side frames in spaced relation and for maintaining the side frames in proper parallelism, said members being operatively connected to each side frame, extending across to the opposite side frame and having longitudinal slidable movement in a direction transverse with respect to the last said side frame.

5. A railroad truck comprising two similar side frames, conjugate members for maintaining said side frames in spaced relation and for maintaining the side frames in proper parallelism, said members being operatively connected to one side frame and having longitudinal slidable movement in a direction transverse to the other frame, and also a pivotal movement with respect to the last said side frame.

6. A railroad truck comprising a side frame, a second side frame spaced therefrom, a member rigidly secured to the first side frame and extending in the direction of and terminating adjacent substantially the center of the second side frame, and a second member rigidly secured to the second side frame and extending in the direction of and terminating adjacent substantially the center of the first side frame, the free ends of said members being each pivotally and slidably connected to the opposite side frame.

7. A railroad car truck comprising side frames, means for maintaining the side frames in parallel planes, said means embodying a member rigidly secured to each of said side frames, the member on one side frame having slidable movement with respect to the other side frame, and in directions transverse to the side frames.

8. A railroad truck comprising spaced side frames, a member rigidly secured to each side frame and extending in overlapping position toward the other side frame, each of said frames including a bearing, a pivot bearing at the free end of each of said members in alinement with the respective first said bearings, and a rod slidably mounted in said bearings.

9. A railroad truck comprising a side frame having a bearing, a second side frame spaced from said first named side frame and having a bearing, a member rigidly secured to the first side frame, a second member rigidly secured to the second side frame, and integral means at the free ends of both members for pivotally supporting said members directly on the opposite side frame, said members also adapted for sliding movement in relation to the respective bearings, in directions transverse to the side frames, said frames being maintained in parallel planes.

10. A railroad truck comprising a side frame having a bearing, a second side frame spaced from said first named side frame and having a bearing, a member rigidly secured to the first side frame, a second member rigidly secured to the second side frame, said members extending past the center of the truck, a rod having its ends slidably and pivotally mounted in said bearings, and means on said members engaging said rod.

11. A railroad car frame comprising a pair of side frames, a member rigidly fixed to one side frame and extending toward the other side frame, so as to engage the latter, and a second member fixed to the second side frame and extending toward the first side frame so as to engage it, the engaging means being pivotal connections connecting the side frames with the ends of said members, whereby said side frames will have relative movement only in parallel planes.

12. A railroad truck comprising a pair of spaced frames and means for permitting each of said frames to have movement in a vertical arc and for maintaining said frames in spaced parallel position, said means comprising a member rigidly secured to one frame and extending toward the other frame, and a second member identical with the first member rigidly connected to the second frame and extending toward the first frame, and means for effecting direct pivotal engagement between said frames and the adjacent ends of said members, the last said means being formed of mutually engaging portions that are integral parts of the respective side frames and said members.

13. A railroad truck comprising a first side frame, a second side frame spaced from the first side frame, a first spacer member operatively connected to said first side frame, a second spacer member adjacent the first spacer member and operatively connected to the second frame, both spacer members extending past the truck center, and means pivotally mounted in said side frames and pivotally connected to said spacer members.

14. A railroad truck comprising a first side frame, a second side frame spaced from the first side frame, a first spacer member operatively connected to said first side frame, a second spacer member adjacent the first spacer member and operatively connected to the second frame, both spacer members extending past the truck center, means pivotally mounted in said side frames and pivotally connected to said spacer members, said means comprising a bearing in each side frame, and a rod mounted in said bearings.

15. A railroad truck comprising a first side frame, a second side frame spaced from the first side frame, a first spacer member operatively connected to said first side frame, a second spacer member adjacent the first spacer member and operatively connected to the second frame, said spacer members extending past the truck center to the opposite side frame, means pivotally mounted in said side frames and pivotally connected to said spacer members, said means comprising a bearing in each side frame, and a pivot shaft pivotally engaging each member at an end thereof and receivable in a said bearing.

16. A railroad car truck comprising a first frame, and a second frame spaced therefrom, an angulated member made from flat metal and rigidly secured to the first frame and extending toward the second frame, a second member identically like the first member and rigidly secured to the second frame and extending toward the first frame, each of said members being arranged closely together and interfitting adjacent sides adapting either frame for relative angular movements in vertical arcs, and means pivotally connecting said members to said frames, the last said means being rigidly secured to the adjacent portion of the opposite side frames and angulated members.

17. A railroad car truck comprising a first frame, and a second frame spaced therefrom, an angulated member made from flat metal and rigidly secured to the first frame and extending toward the second frame, a second member identically like the first member and rigidly secured to the second frame and extending toward the first frame, each of said members being arranged closely together and interfitting means adapting either frame for movement in a vertical arc, said means comprising adjacent bearings on the frames and members, and rod means in said bearings.

18. A railroad car truck comprising a first frame, and a second frame spaced therefrom, an angulated member made from flat metal and secured to the first frame and extending toward the second frame, a second member identically like the first member and secured to the second frame and extending toward the first frame, each of said members being arranged closely together, interfitting means adapting either frame for movement in a vertical arc, said means comprising adjacent bearings on the frames and members, rod means in said bearings, said rod means having slidable movement in the bearings, spring means between the rod means and a bearing on a frame, and means to limit said slidable movement of the rod means in a bearing.

19. A railroad truck embodying spaced side frames, similarly shaped spacer members, one end of each of the members being rigidly secured to one of said side frames at substantially the longitudinal center of the frames, said members being disposed in close proximity to each other and extending across the transverse center of the truck, the free ends of the said members being disposed adjacent and at substantially the longitudinal center of the opposite frame, and means for effecting a pivotal engagement of the said free ends with the respective proximate side frame.

20. A railroad truck embodying spaced side frames, similarly shaped spacer members, one end of each of the members being rigidly secured to one of said side frames at substantially the longitudinal center of the frames, said members being disposed in close proximity to each other and extending across the transverse center of the truck, the free ends of the said members being disposed adjacent and at substantially the longitudinal center of the opposite frame, and means for effecting a slidable pivotal engagement of the said free ends with the respective proximate side frame.

JAMES L. HAYNES.

REFERENCES CITED

The following references are of record in the file of this patent:

UNITED STATES PATENTS

| Number | Name | Date |
|---|---|---|
| 544,417 | Pyott | Aug. 13, 1895 |
| 563,285 | Lamkey | July 7, 1896 |
| 1,640,180 | Buckwalter | Aug. 23, 1927 |
| 2,201,861 | Hanna | May 21, 1940 |
| 2,212,989 | Levy | Aug. 27, 1940 |
| 2,231,195 | Piron | Feb. 11, 1941 |
| 2,267,589 | Eksergian | Dec. 23, 1941 |
| 2,316,592 | Johnston | Apr. 13, 1943 |